(12) United States Patent
Ehrlich et al.

(10) Patent No.: US 6,519,107 B1
(45) Date of Patent: Feb. 11, 2003

(54) HARD DISK DRIVE HAVING SELF-WRITTEN SERVO BURST PATTERNS

(75) Inventors: Richard M. Ehrlich, Saratoga, CA (US); Jong Lin, Cupertino, CA (US); David B. Jeppson, Livermore, CA (US); Kenji Oki, Konandai Sukumo (JP)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 09/406,247

(22) Filed: Sep. 24, 1999

(51) Int. Cl.[7] .............................................. G11B 21/02
(52) U.S. Cl. ...................................................... 360/75
(58) Field of Search ............................... 360/77.08, 53, 360/104, 78.05, 75

(56) References Cited

U.S. PATENT DOCUMENTS

| | | | |
|---|---|---|---|
| 4,414,589 A | | 11/1983 | Oliver et al. |
| 5,189,578 A | | 2/1993 | Mori et al. |
| 5,339,204 A | | 8/1994 | James et al. |
| 5,448,429 A | | 9/1995 | Cribbs et al. |
| 5,570,247 A | | 10/1996 | Brown et al. |
| 5,668,679 A | | 9/1997 | Swearingen et al. |
| 5,726,879 A | | 3/1998 | Sato |
| 5,745,319 A | * | 4/1998 | Takekado et al. ........ 360/78.05 |
| 5,748,398 A | | 5/1998 | Seo |
| 5,757,574 A | | 5/1998 | Chainer et al. |
| 5,793,554 A | | 8/1998 | Chainer et al. |
| 5,793,559 A | | 8/1998 | Shepherd et al. |
| 5,856,896 A | * | 1/1999 | Berg et al. .................... 360/104 |
| 5,892,634 A | * | 4/1999 | Ito et al. ................... 360/77.08 |
| 5,926,336 A | * | 7/1999 | Le et al. ........................ 360/75 |
| 5,986,847 A | * | 11/1999 | Le et al. .............. 360/77.08 X |
| 6,023,389 A | * | 2/2000 | Cunningham ................. 360/75 |
| 6,181,500 B1 | * | 1/2001 | Serrano et al. ................ 360/53 |

OTHER PUBLICATIONS

Ono, H., "Architecture and performance of the ESPER–2 hard disk drive servo writer", IBM J. Res. Develop., vol. 37, No. 1, Jan. 1993, pp. 3–10.

* cited by examiner

*Primary Examiner*—David Hudspeth
*Assistant Examiner*—K. Wong

(57) ABSTRACT

A method for servowriting a magnetic hard disk drive includes servowriting a first servo burst pattern by using a servowriter coupled to a head-disk assembly within a clean room environment, self-writing at least a second servo burst pattern radially offset relative to the first burst pattern by reading the first burst pattern without using the servowriter, and self-writing a final burst pattern by using the first burst pattern and the second burst pattern without using the servowriter. One or more intermediate burst patterns may be provided to accommodate writer/reader offset of dual element read heads in order to produce final product servo burst patterns. A disk drive having embedded servo sectors each including an untrimmed six-burst final servo pattern is also disclosed. The disk drive self-writes at least some of the final servo pattern.

36 Claims, 9 Drawing Sheets

MR read-element

Trimmed bursts

MR read-element

Untrimmed bursts

HARD DISK DRIVE HAVING SELF-WRITTEN SERVO BURST PATTERNS

FIELD OF THE INVENTION

This invention relates generally to head positioning in magnetic hard disk drives. More specifically, the present invention relates to a method for writing head position reference servo patterns on a magnetic data storage disk by employing a servowriter to record a coarse position reference burst pattern, and then by employing the disk drive servo to self-write a final fine position burst reference pattern based on the coarse position burst reference pattern.

BACKGROUND OF THE INVENTION

Magnetic hard disk drives conventionally employ rotary voice coil head positioners for rapidly moving a data transducer head between concentric data tracks during track seeking operations and for maintaining the head over a selected data track during user data writing or reading operations. The data transducer head is maintained in very close proximity to a rotating magnetic data storage surface by flying on an air bearing at approximately one microinch, or less, above the surface. In this way, lineal data storage densities can be made very high. As lineal recording densities have begun to approach practical limits, another more recent trend for increasing storage capacity has been to make effective head magnetic widths narrower and narrower, in order to reduce track width and thereby increase the number of concentric data tracks that may be defined on a disk storage surface of standard manufacturing size, such as 3.5 inches in diameter.

Dual head structures have been adopted in order to recover discernable flux transition signals recorded on the disk. An inductive write element is used to write flux transitions onto the disk, while a separate read element of magneto-resistive or giant magneto-resistive material is used to read the flux transitions from the disk. It is known to provide a relatively wide write element, and a relatively narrow read element. In fact, narrower read elements are presently preferred because they permit a track to be read even though the head may not be precisely registered with, or maintained at, a track centerline by the head positioner. This relaxed tracking tolerance means that a less complex and expensive head position tracking system (servo) can be employed within the disk drive product. The use of separate write and read elements necessitates different tracking target positions for reading and writing, because of the presence of manufacturing tolerances. When a rotary head positioner is used, the write-to-read offset (the radial separation between the optimum tracking targets for writing and reading on a given track) clearly varies across the stroke of the rotary positioner as a function of the skew angle of the head support structure (air bearing slider body) relative to the recorded track. This offset variation at any particular position is known as the "write-to-read offset". One drawback of narrow read elements is that such elements make it difficult to obtain a good position error signal ("PES") at all positions across the radial width of a data track when used with a traditional burst pattern, for example the pattern described in commonly assigned U.S. Pat. No. 5,170,299 to R. Moon, entitled: "Edge Servo for Disk Drive Head Positioner", the disclosure thereof being incorporated herein by reference. This drawback requires provision and use of a special servo burst pattern that provides a usable PES at virtually all radial head positions, relative to actual center, for each track across the actuator stroke.

The write and read elements of dual head structures can have certain positional offsets, particularly when a rotary voice coil actuator is used to position dual-element heads. With a rotary actuator the positional offsets between the write and read elements vary over the rotational stroke of the actuator and head transducer relative to the disk surface.

Because the data tracks are placed very close together (high track density of 1,000 to 20,000 tracks, or greater, per disk radial inch) a head position servo loop is typically provided as part of the disk drive electronics in order to control the head positioner. In order to provide head position information to the servo loop, each magnetic storage surface typically carries recorded servo information. This information is most frequently "embedded" within each data track as a circumferential series of narrow servo sectors between user data sectors or segments, sometimes referred to as "wedges" or "spokes". The servo information typically comprises certain phase-coherent digital information used during track seeking and coarse positioning operations, and fine position information typically in the form of burst patterns used for head tracking during reading and writing operations from and to a particular track. Once written during a servowriting step within the disk drive manufacturing process, servo sectors are thereafter protected by disk drive controller logic from overwriting as being denominated "read-only" areas of the disk's storage surface. As the head passes over a servo sector location, coarse and fine position information is sampled by the head, and this sampled information is provided to, and used by, the disk drive's servo control loop for closed loop control of the head positioning apparatus during track seeking and track following operations.

In order to provide precisely written servo information, very precise servowriting instruments, typically employing laser-based interferometer technology, are employed within "clean rooms" of the drive manufacturing facility wherein atmospheric particulate contamination is closely controlled. Clean rooms are required because the disk drive is typically servo-written with its interior exposed to the ambient environment. The laser-interferometer servowriter precisely measures actuator position of the disk drive. Based upon this precisely measured position, a drive head positioner, such as a rotary voice coil actuator, is moved under servowriter control from track to track while each data head in turn writes the servo information to an associated data storage surface. Once the servo pattern is written, it can be tested by a read back procedure while the drive remains at the servowriter station in order to verify that the servo patterns have been effectively and accurately written. It is known to write servo bursts with three passes per track under servowriter control. However, with a high number of tracks on each disk surface, the servo burst writing process can become very time consuming and therefore very expensive.

Representative examples of disk drive servowriters and servowriting techniques are provided in U.S. Pat. No. 5,748, 398 to Seo, entitled: "Method for Writing Servo Signals onto a Magnetic Disk and Magnetic Disk Drive Equipped with Magnetic Disk(s) Having Servo Pattern Recorded by the Method"; U.S. Pat. No. 5,726,879 to Sato, entitled: "Control Apparatus, a Stage Apparatus and a Hard Disk Servowriter Apparatus Including a Robust Stabilizing Compensator"; U.S. Pat. No. 5,627,698 to Malek, entitled: "Servo Information Recording Method and Apparatus for an Enclosed Data Storage System"; U.S. Pat. No. 5,339,204 to James et al., entitled: "System and Method for Servowriting a Magnetic Disk Drive", the disclosures thereof being incorporated herein by reference. One characteristic which is common to servowriters is that they are very complex and expensive items of capital equipment within the disk drive manufacturing process. Servowriter and related clean room costs must be amortized as an incremental cost burden of each disk drive being produced and servowritten.

It has been proposed to write a servo pattern on a surface of a reference disk with a servowriter. Following installation of the reference disk onto a disk drive spindle, the reference servo patterns are used to write embedded servo patterns onto other storage surfaces within the disk drive. Such approach is described by H. Ono, in an article entitled: "Architecture and Performance of the ESPER-2 Hard-Disk Drive Servowriter", *IBM J. Res. Develop.* Vol. 37, No. 1, January 1993, pp. 3–11. One drawback of the approach described by Ono is that a center of revolution of the reference disk on the servowriter may not correspond to a center of revolution of the reference disk in the disk drive, and that non-repeatable runout errors in radial and tangential dimensions differ between the different disks in the disk drive. (Tangential tracking errors interfere with servo information phase coherency and impose limitations upon servo clocking speed for the phase coherent digital servo information fields).

Since a data storage disk surface may contain media defects or anomalies, it has been proposed to write multiple servo pattern sets and then select an error free set, while overwriting (erasing) the other sets. This approach is described in commonly assigned U.S. Pat. No. 5,553,086 to Sompel, et al., entitled: "Multiple Servo Sector Sets Write With Self-Verification for Disk Drive", the disclosure thereof being incorporated herein by reference.

As already mentioned the embedded servo information typically comprises certain digital data followed by certain fine position bursts recorded at a fixed frequency used for following a particular data track. The digital data desirably remains phase-coherent from track to track so that it can be read during track seeking operations, and also read while the servo system is track-following between two tracks. The fine position bursts are circumferentially sequential and radially offset, so that as the head passes over fractional portions of burst sets, fractional burst amplitude samples are read. These amplitude samples are compared and used by the servo system to generate a PES to control head position during track following operations when reading and writing is carried out. Because of the write-to-read offset or offset between the read and write elements of a dual head structure at a particular track location, micro-jogging operations may be employed for proper head positioning. A disk drive having a head transducer comprising a relatively wide inductive write element and a relatively narrow magneto-resistive read element, and wherein the head transducer is positioned by micro-jogging a rotary voice coil actuator, is illustrated and described in commonly assigned U.S. Pat. No. 5,587,850 to Ton-that, entitled: "Data Track Pattern Including Embedded Servo Sectors for Magneto-Resistive Read/Inductive Write Head Structure for a Disk Drive", the disclosure thereof being incorporated herein by reference.

Following servowriting and while remaining within the clean room environment, the disk drive head-disk- assembly ("HDA") is sealed to prevent external particulate contamination. After the HDA has been sealed and moved out of the clean room, an electronics circuit board is connected to the HDA to complete the physical assembly of the drive. At this stage, the fully assembled disk drive is sent to a burn-in rack or self-scan station where it is typically operated continuously over a period of time, and also typically over a range of temperatures, to assure reliability. Also, during self-scan, the drive conducts certain self-scan operations and discovers and develops certain facts and characteristics about itself, such as the reliability and characteristics of the heads and storage disks, and the locations of any media defects. These data are then typically recorded on reserved tracks of the disk drive and may be used later during normal disk drive operations in order to maintain and control drive performance. Also, during self-scan, certain configuration and operational firmware and software may be transferred to reserved tracks of the disk(s) for later use by the embedded disk drive controller during normal drive data storage and retrieval operations.

As the number of data storage tracks per disk surface (track density) increases, servowriter accuracy and writing time proportionally increases. While it is theoretically possible to provide an unlimited number of expensive servowriters within a clean room drive manufacturing environment, in practice a limited number of servowriters only are available, and servowriting time can become a manufacturing bottleneck, particularly as newer disk drive designs have included storage surfaces having thousands of data tracks. Also, it would be desirable to utilize servowriters of a given writing accuracy over a number of product cycles, each cycle typically manifesting increased track density.

Burn-in or self-scan racks are far less expensive than servowriters, and adding self-scan rack capability to the manufacturing process raises the burdened costs of the drive far less than adding servowriting capacity.

One proposal to reduce the cost of servowriting disk drives has called for moving the servowriter out of the expensive clean room. This approach calls for localized ambient air purification and scrubbing as by injecting clean air into a clock head port of the disk drive in a positive pressure arrangement such that the injected air exits the drive at the servowriter push-pin port. While this is a cheaper approach than the clean room, it still requires an expensive servowriter apparatus, and the possibility of particulate contamination entering the disk drive interior is greater than from using the clean room environment.

Several self-servo-writing methods and algorithms have been proposed in an attempt to avoid the cost and inconvenience of the servowriter entirely. One such approach is described in commonly assigned U.S. Pat. No. 5,668,679 to Swearingen et al, entitled: "System for Self-Servowriting a Disk Drive", the disclosure thereof being incorporated herein by reference. Other examples are found in U.S. Pat. No. 5,448,429 to Cribbs et al. entitled: "Self-Servowriting Disk Drive and Method"; U.S. Pat. No. 5,541,784 to Cribbs et al. entitled: "Bootstrap Method for Writing Servo Tracks on a Disk Drive"; U.S. Pat. No. 5,757,574 to Chainer et al., entitled: "Methods and Systems for Self-Servowriting Including Maintaining a Reference Level Within a Usable Dynamic Range"; U.S. Pat. No. 5,793,554 to Chainer et al., entitled: "Self-Servowriting System with Dynamic Error Propagation Reduction"; U.S. Pat. No. 5,570,247 to Brown et al., entitled: "Self Servowriting File"; and U.S. Pat. No. 4,414,589 to Oliver et al., entitled: "Embedded Servo Track Following System and Method for Writing Servo Tracks", the disclosures thereof being incorporated herein by reference.

While complete self-servowriting is a highly desirable goal, it is very difficult to realize in practice, given manufacturing tolerances in head widths, gains, alignments, storage media characteristics and quality, etc. Simply put, self-servowriting procedures so far have proven problematic in disk drive mass production in providing digital servo information that remains phase coherent from track to track across the data storage surface, and in establishing sufficiently accurate positioning for servo bursts needed to provide linear PES values for current data track densities, which are quickly approaching 20,000 tracks per inch. Such high track densities not only require more precisely written servo reference patterns, but also high bandwidth servo control loops. High bandwidth servo loops may be implemented by use of dual-stage actuators, for example. One dual-stage actuator employing a piezoelectric device within a magnetic head arm is described in U.S. Pat. No. 5,189,578 to Mori et al., entitled: "Disk System with Sub-Actuators for Fine Head Displacement", the disclosure thereof being incorporated herein by reference.

Therefore, a hitherto unsolved need has remained for a servowriting procedure which minimizes actual servowriter time while enabling the disk drive to self-servo-write embedded servo burst patterns supporting very high data track densities during drive burn in without need for writing coherent patterns outside of the servowriter environment.

SUMMARY OF THE INVENTION WITH OBJECTS

One object of the present invention is to reduce the amount of time that a disk drive spends at a servowriter station during disk drive manufacturing in a manner overcoming limitations and drawbacks of the prior art.

Another object of the present invention is to improve the quality of product servo burst patterns by removing certain unwanted pattern artifacts, such as those attributable to disk vibration, during a self-servo-writing process following reference pattern writing within a servowriter environment.

A further object of the present invention is to provide a method for self-servo-writing of magnetic hard disk drives based on reference servo patterns written with the aid of a servowriter in a manner overcoming limitations and drawbacks of the prior art.

Yet another object of the present invention is to employ a servowriter within a disk drive manufacturing process to record phase-coherent digital servo information and a reference burst pattern, and then use the completed disk drive to self-write more detailed and comprehensive servo burst patterns derived from the reference burst pattern during extended self-scan operations.

As a related object of the present invention, a servowriter writes an initial untrimmed three-burst-per-two-track burst pattern, and the disk drive writes a product burst pattern at one-third track pitch intervals by following the initial three-burst-per-two track burst pattern without determining write element width or read element width, so long as write-to-read offset is determined.

One further object of the present invention is to extend the useful service life of servowriters over a number of generations of disk drive products wherein each generation has a track density increased from a prior generation, without need for upgrading the servowriter to match the highest or latest track density layout or design.

Yet one more object of the present invention is to produce a servo format with sufficient PES linearity to enable use of very narrow magnetoresistive read elements relative to writer width (e.g., less than 40 percent of track pitch) without increasing servowriter time.

Yet another object of the present invention is to transfer a significant portion of disk drive servowriting activity from an expensive servowriter environment to the disk drive within a less expensive drive self-scan environment, resulting in disk drives made at less expense and with greater reliability.

Still another object of the present invention is to servowrite a family of hard disk drives having heads characterized by wide reader/writer tolerances in a manner which optimizes manufacturing utilization of clean room servowriters by having each disk of the family self-write at least significant portions of a final embedded servo burst pattern on each storage surface in accordance with particular head characteristics within each drive.

In accordance with principles of the present invention, a method for servowriting a magnetic hard disk of a head-disk assembly comprises the following steps:

servo-writing a reference servo burst pattern using a servowriter coupled to the head-disk assembly at a servo-writing station within the disk drive manufacturing operation, completing assembly of the disk drive by attaching and connecting an electronics board to the head-disk assembly within the manufacturing operation, transferring the completed disk drive to a burn-in rack, transferring certain self-servo-write control software to the disk drive, and operating the disk drive at the burn-in rack to self-write at least a portion of a final servo burst pattern by using the reference burst pattern written to the head-disk assembly by the servowriter. In this regard, the disk drive may self-write intermediate servo bursts patterns which are used to self-write the final servo burst pattern in order to take into account write-to-read offset from a rotary positioner of the disk drive.

In a related aspect of the present invention, a magnetic hard disk drive has at least one data storage disk rotated by a spindle motor and at least one head transducer comprising an inductive write element and a magneto-resistive read element and positioned at radial track locations defined on a storage surface of the disk by a head positioner. Upon final assembly the disk drive includes a write/read channel connected to the head transducer, a spindle driver for driving the spindle motor, a positioner driver for driving the head positioner, an interface for connecting the drive to an external computing environment and including a cache buffer, and a drive controller for controlling at least the head positioner to position the head transducer at selected data tracks. In this example of the invention the disk drive has reference servo patterns recorded onto at least a part of the storage surface by a servo writer as a part of a manufacturing process, the reference servo patterns being incomplete with respect to a final product pattern. After final assembly the disk drive is loaded with and executes self-servo-writing software for self-writing embedded servo final product patterns across the storage surface based upon the reference servo patterns. The reference servo patterns may be part of the final product pattern, or they may be discarded and overwritten. In addition, intermediate servo burst patterns may be written for some tracks in order to compensate for write-to-read offsets and/or differences between relatively wide write element magnetic width (e.g. 66–120% of track width) and relatively narrow read element magnetic width (e.g. 35–75% of track width). Calibration processes carried out within the self-servo-writing process determine the need for, and location of, any intermediate servo burst patterns. Phase coherent servo fields including track number information may also be included within the reference servo patterns and the final product servo patterns.

In one more example including principles of the present invention, a disk drive comprises a magnetic data storage disk having a storage surface defining an embedded servo pattern. The drive also includes a head transducer comprising a magnetic write element having a magnetic writing width in a range between 66% and 120% of nominal track width, and a magneto-resistive read element having a magnetic reading width in a range between 35% and 75% of the nominal track width, and a head positioner for positioning the head transducer relative to concentric data storage tracks further defined on the storage surface. In this example the embedded servo pattern includes for each pair of adjacent data tracks a six servo burst pattern of circumferentially sequential, radially offset untrimmed bursts A, B, C, D, E and F. A four servo burst pattern per track employing trimmed bursts may also be employed with slightly less tolerance for head width variances; however, one drawback of trimming and writing bursts in the same pass is that there is less randomness along each trimmed burst edge and therefore higher written-in repeatable runout ("RRO").

These and other objects, advantages, aspects, and features of the present invention will be more fully appreciated and understood upon consideration of the following detailed description of preferred embodiments presented in conjunction with the accompanying drawings.

DETAILED DESCRIPTION OF PREFERRED EMBODIMENTS

Figure 2:
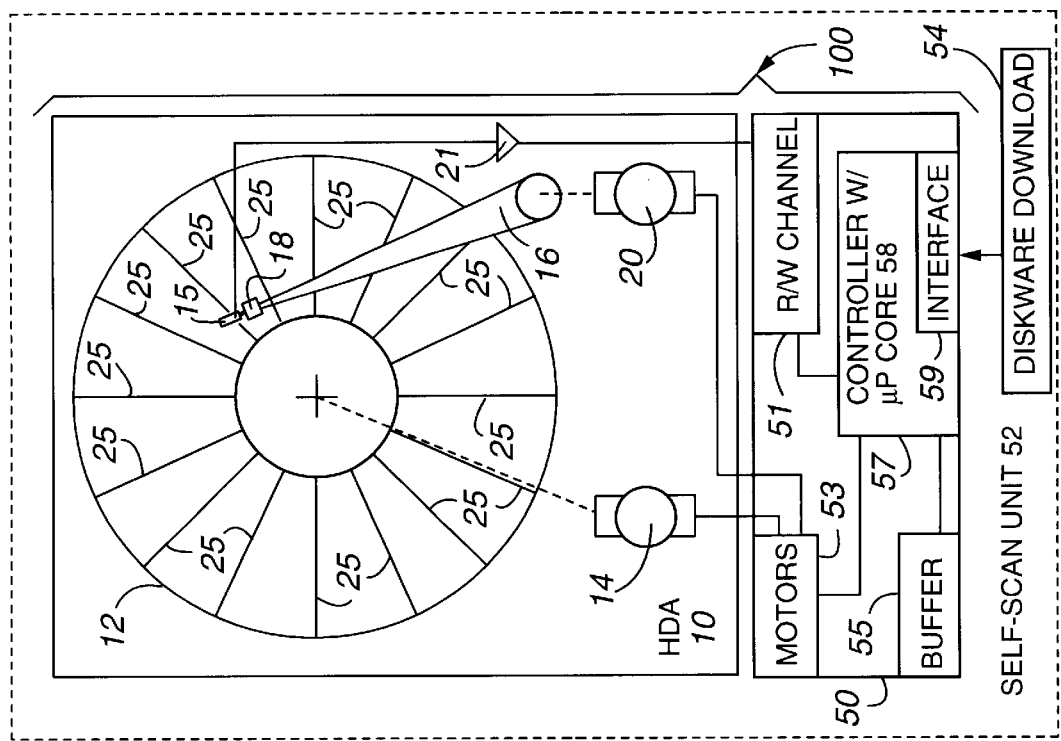
FIG. 2 is a view similar to the FIG. 1 view except that the head-disk assembly has been sealed and provided with a drive electronic circuit board to complete disk drive assembly, and has been moved to a burn-in unit, for self-writing a servo burst product pattern further in accordance with principles of the present invention.
Figure 1:
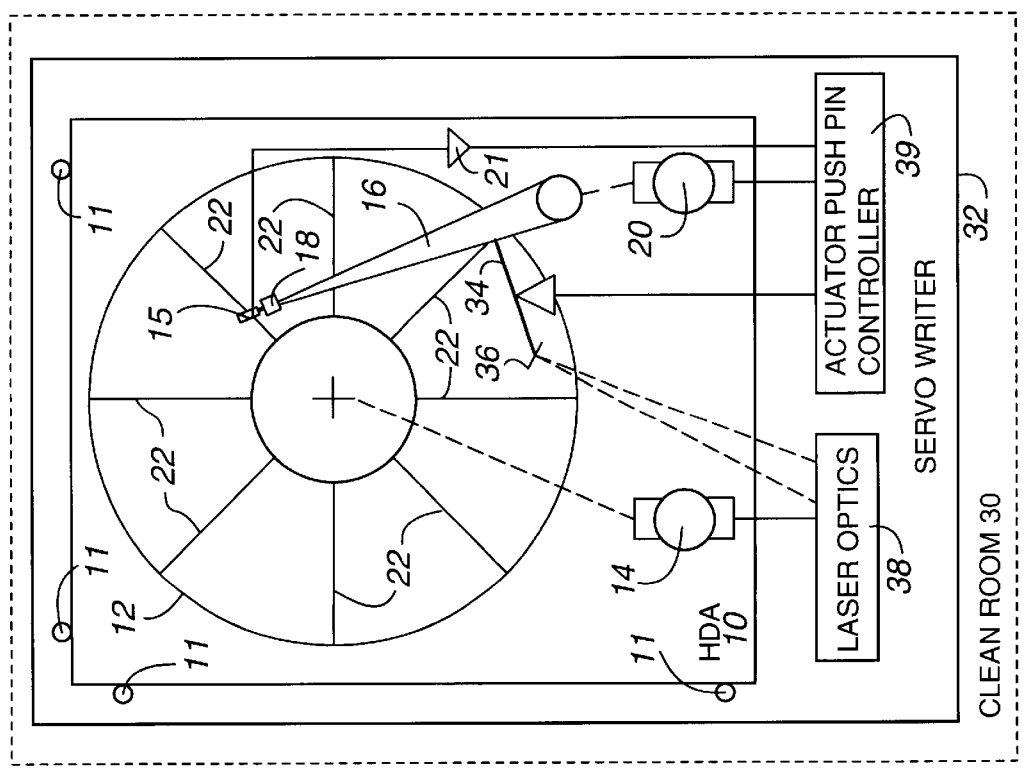
FIG. 1 is a highly diagrammatic plan view of a disk drive head-disk assembly located at a servowriter station within a clean room for servowriting a first reference burst pattern in accordance with principles of the present invention.

Referring to FIGS. 1–2, wherein like reference characters designate like or corresponding structural elements throughout the views, a head-disk assembly (HDA) 10 includes at least one data storage disk 12 having at least one major surface carrying a magnetic coating or deposition for storing user data in concentric data tracks defined thereon. The disk 12 is rotated at a predetermined angular velocity by a disk spindle motor 14. A data transducer head structure 15 includes an air bearing slider carrying a relatively wide write element 17 and a relatively narrow read element 19. The write element 17 is inductive, whereas the read element employs magneto-resistive principles (e.g. AMR, GMR, or more advanced head technology, e.g. "colossal magneto-resistive" principles). The head structure 15 is gimbal-mounted to a distal end of a head arm 16 so that the slider is free to follow closely above (one micro-inch or less) the disk surface upon an air bearing as is known in the art. A proximal end of the head arm 16 is journal mounted to a base of the HDA 10 and rotated relative to the disk surface by a rotary voice coil actuator motor 20. The distal end of the head arm 16 may include a suitable micro-actuator 18 thereby realizing a dual-stage actuator head positioner. Micro-actuators are shown in the Mori et al. U.S. Pat. No. 5,189,578 referenced above, and also in U.S. Pat. No. 5,867,347 to Knight et al., entitled:

"Head Suspension with Stacked Coil Microactuator for Tracking Axis Adjustment of a Read/Write Head", for example. Typically, the completed HDA will include a preamplifier, head selector, write driver integrated circuit 21 which is mounted as close to the head 15 as practical in order to maximize signal to noise during readback operations.

In FIG. 1 the assembled HDA 10 is within a clean room 30 at a servowriter station 32 and placed in registration with alignment pins 11. The HDA 10 includes an opening formed in a base wall, sidewall or cover plate for admitting a mechanical or virtual (e.g. optical) push-pin 34 of the servowriter 32. The push-pin 34 has an engagement end which engages the actuator arm 16 and another end coupled to a retro-reflector 36. The retro-reflector 36 reflects a laser beam back to a laser optics unit 38 within the servowriter 32. The laser optics unit 38 uses conventional laser interferometry techniques to determine precise relative location of the retro-reflector 36 relative to reference pins 11 and thereby indirectly determines relative position of the push-pin 34 and actuator arm 16 relative to the disk 12. This relative position information is fed into an actuator push-pin controller unit 39 which controls position of the push-pin 34 and thereby controls position of the actuator head arm 16 during servowriter aided servowriting operations.

In accordance with principles of the present invention, the servowriter 32 controls the spindle motor 14, the actuator motor 20 and the head 15 via circuit 21 in order respectively to rotate the disk 12, position the actuator 16, (and micro-actuator 18, if a dual-stage actuator is present), and write and check phase-coherent digital servo information fields 23 and servo burst patterns to the disk 12. An initial reference servo burst pattern 22 of radial servo reference bursts A, B, and C is recorded by the relatively wide inductive write element 17 of the head 15 under the control of the servowriter 32. As servowritten, the initial reference servo burst pattern 22 comprises an untrimmed three-burst pattern. As written, the initial servo burst reference pattern is sufficient to enable the read element 19 of head 15 to servo at some, but probably not all, locations within any particular data track defined on the data surface, depending upon the reader and writer element widths. Most preferably, the initial servo burst reference pattern provides sufficient information to enable servoing over a sufficient area so that only a single set of intermediate bursts is needed to produce the final product servo bursts for all tracks. However, if needed in certain situations, it remains practical to provide multiple sets of intermediate bursts in order to achieve a final product servo burst pattern.

After the initial servo burst pattern 22 is written at the servowriter station 32, the HDA 10 is sealed relative to the ambient (as by placement of a protective stickers over e.g. the push-pin opening and a clock track head opening in the base wall, sidewall or cover plate). The sealed HDA 10 is then moved from the clean room environment to an assembly station at which a drive circuit board 50 carrying disk drive electronics may be mounted to and electrically connected to the HDA 10. The drive circuit board typically includes a read/write channel 51, a spindle and actuator motor driver chip 53, a cache buffer memory array 55, and a digital controller chip 57 including an embedded programmed digital microprocessor core 58 and an interface 59. More or fewer chips may actually included on the board 50, depending upon the particular circuit integration at the chip/board level.

In the FIG. 2 view, a drive electronics printed circuit board 50 has been attached and to the HDA 10 and connected to the head 15 via preamplifier 21, spin motor 14, and actuator voice coil motor 20, and the read/write channel 51 is connected to the read and write elements of the head 15 via the circuit 21. A structurally completed hard disk drive 100 results. The completed disk drive 100 is then moved to a self-scan unit 52. The self-scan unit 52 includes a diskware download station 54 for downloading disk control software, including self-servo-write control software, from a central computer, e.g. to reserved tracks 41 for retrieval and execution by the drive's digital controller on the circuit board 50.

These reserved tracks 41 may be completely servowritten to enable easier code writing for the completed hard disk drive 100. Alternatively, the disk control firmware can be stored in electrically programmable read only memory on the drive's circuit board 50, or it can be downloaded to the drive via a serial port facility included as an additional part of the drive electronics.

Alternatively, a special circuit board may be connected to the head 15 via preamplifier 21, the spin motor 14, and the actuator voice coil motor 20. This special circuit board would typically include the functions identified in association with the disk drive product circuit board 50 shown in FIG. 2, but would be specially adapted for drive self-servo-writing operation, and therefore typically be endowed with greater computing speed and capacity than the drive circuit board, enabling use of multiple self-written servo bursts and multi-rate servo pattern sampling techniques, etc., in order to self-write a final burst pattern. After the final product servo patterns are self-written, the special circuit board would be disconnected, and a drive circuit board 50 would be installed and connected, thereby completing disk drive assembly. Diskware download via the function 54 could then occur via the interface 59 or a separate serial port of the circuit board 50, or diskware could be downloaded via the specialized circuit board.

While the disk drive 100 is at the self-scan unit 52, a second, intermediate servo burst pattern 24 of bursts d, e and f (FIG. 7), may be self-written onto the disk 12 for some tracks, depending upon measured write-to-read offset, for example. The assembled drive 100 can remain at the self-scan station for several hours. As explained later on, the self-scan process may require up to one or more hours per head and surface to carry out the self-servowriting processes of the present invention. By the time the disk drive 100 leaves the self-scan unit 52, a final servo burst pattern 25 will have been self-written to the disk 12 at each product servo sector location.

Preferably, although not necessarily, original servowritten and/or self-written intermediate servo burst patterns not comprising the final product servo burst pattern, will be overwritten or DC erased, since these original/intermediate patterns are not needed for drive servo operation and therefore are located in storage areas which will later be used to store user data during normal disk drive operations. Also, bands of reference track patterns 40 (FIG. 6B) and the disk self-servo-write software stored on reserved tracks 41 of disk 12, may be overwritten with control software downloaded via a diskware download process 54. The control software will be available for retrieval and use by the disk drive 100 during normal disk drive data storage and retrieval operations. Active portions of the control software are held in reserved page areas of the buffer 55 and executed by the digital controller core 58 within the drive chip 57.

A drive head position servo control loop uses the final product embedded servo patterns written to each data storage surface, and structurally includes the read element 19 of a head 15 associated with a particular surface, the preamplifier chip 21, the read/write channel 51, the digital controller core within 57, the motor driver chip 53 and the voice coil actuator motor 20 (and micro-actuator driver if micro-actuators 18 are included as part of the head arm assembly 18). Various analog to digital converters and digital to analog converters are also included within the head position servo control loop as is well understood by those skilled in the art and therefore not described herein in any further detail.

An initial issue confronting the disk drive designer is whether to employ "trimmed bursts" or "untrimmed bursts".

Figure 3A:
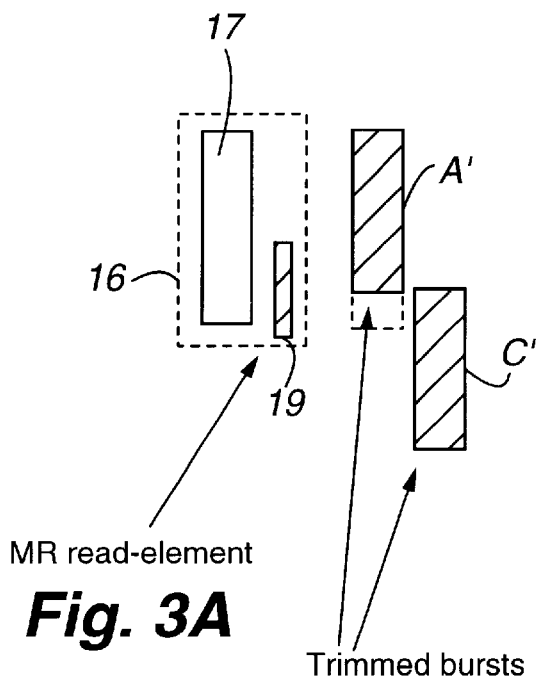
FIG. 3A is a schematic representation of an MR read-element juxtaposed next to two radially offset, radially trimmed bursts.

A trimmed servo burst is one in which a radial edge of the burst is DC erased during a subsequent pass of the write element at a displaced radial position relative to the disk. A trimmed burst pattern is shown in FIG. 3A wherein a servo burst A' has a lower radial edge which has been trimmed (the portion of the burst enclosed in the dashed line block has been DC erased) to be in alignment with the upper radial edge of an adjacent burst C'. It is possible to trim a previously written burst, such as burst A' during a single pass of the write transducer 17 along a servowriting path for writing the C' burst. However, it has been discovered that a repeatable runout error (RRO) was reduced by a factor of about a square root of two when an untrimmed burst pattern is used in lieu of a single-pass-trimmed burst pattern. It is believed that the burst null point for an untrimmed burst pattern is determined by non-repeatable runout error (NRRO) of two different servowriting passes (one pass for each burst written), while the burst-null-point for a trimmed pattern as shown in FIG. 3A is determined by the NRRO of a single pass (wherein the write element trims one burst and writes another burst). While the FIG. 3A trimmed-burst pattern could be written in a way to reduce its RRO by the $\sqrt{2}$ factor by requiring two passes for each burst: one pass to trim the previous burst and a second pass to write the burst, such approach would nearly double the servowriting time spent at the servowriter station 32.

Figure 3B:
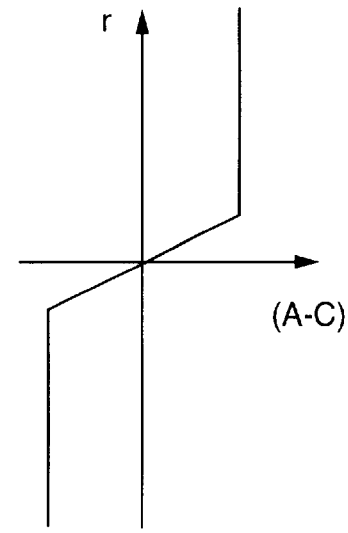
FIG. 3B is a graph of burst amplitude difference as a function of MR read-element radial displacement from a burst-established track centerline for the FIG. 3A trimmed burst pattern.

FIG. 3B graphs a PES which is linear as a function of radial offset of the MR reader element 19 about a centerline (A-C) passing through the aligned edges of the A' and C' trimmed bursts. If the writer element 17 is about ⅔ of a track wide, then the PES linearity signal should be about the same for trimmed or untrimmed servo bursts. However, for writer elements 17, which have electrical writing widths greater than about ⅔ of the track width, the useable portion of the PES curve is larger for untrimmed bursts. FIGS. 3A and 3B show the A'-C' burst amplitude difference (PES) as a function of radial displacement of the MR read element 19 for the two trimmed bursts A' and C'. The idealized curve presented as FIG. 3B has a linear portion, bounded on both sides by flat lines. The useable portion of the FIG. 3B curve is simply the linear portion of the curve.

Figure 4A:
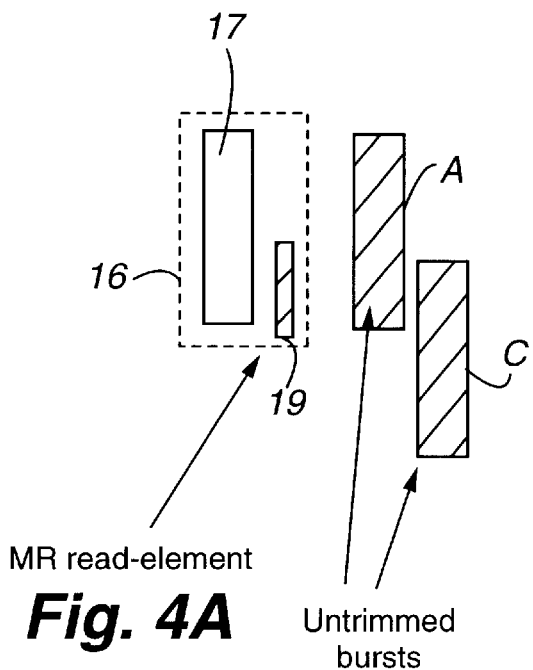
FIG. 4A is a schematic representation of an MR read element juxtaposed next to two untrimmed, radially offset bursts.
Figure 4B:
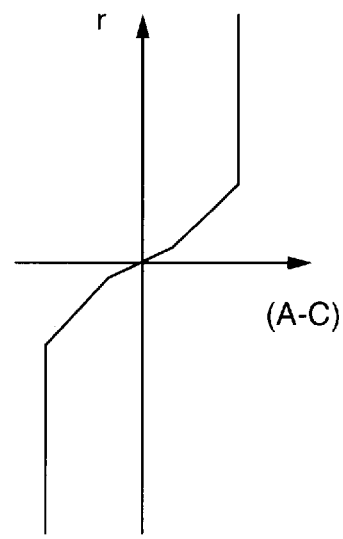
FIG. 4B is a graph of burst amplitude difference as a function of MR read-element radial displacement from a burst-established track centerline for the FIG. 4A untrimmed burst pattern.

FIGS. 4A and 4B show an equivalent situation for untrimmed bursts A and C. The linear portion of the FIG. 4B curve, centered about (A-C)=0, is smaller than that of the trimmed burst pattern, but the useable, non-flat portion of the FIG. 4B curve extends over a larger radial displacement of the MR read element 19 relative to the disk. If a PES linearization method is used to re-linearize the PES within the drive servo loop, then the FIG. 4A untrimmed burst pattern has a larger useable region.

Figure 5:
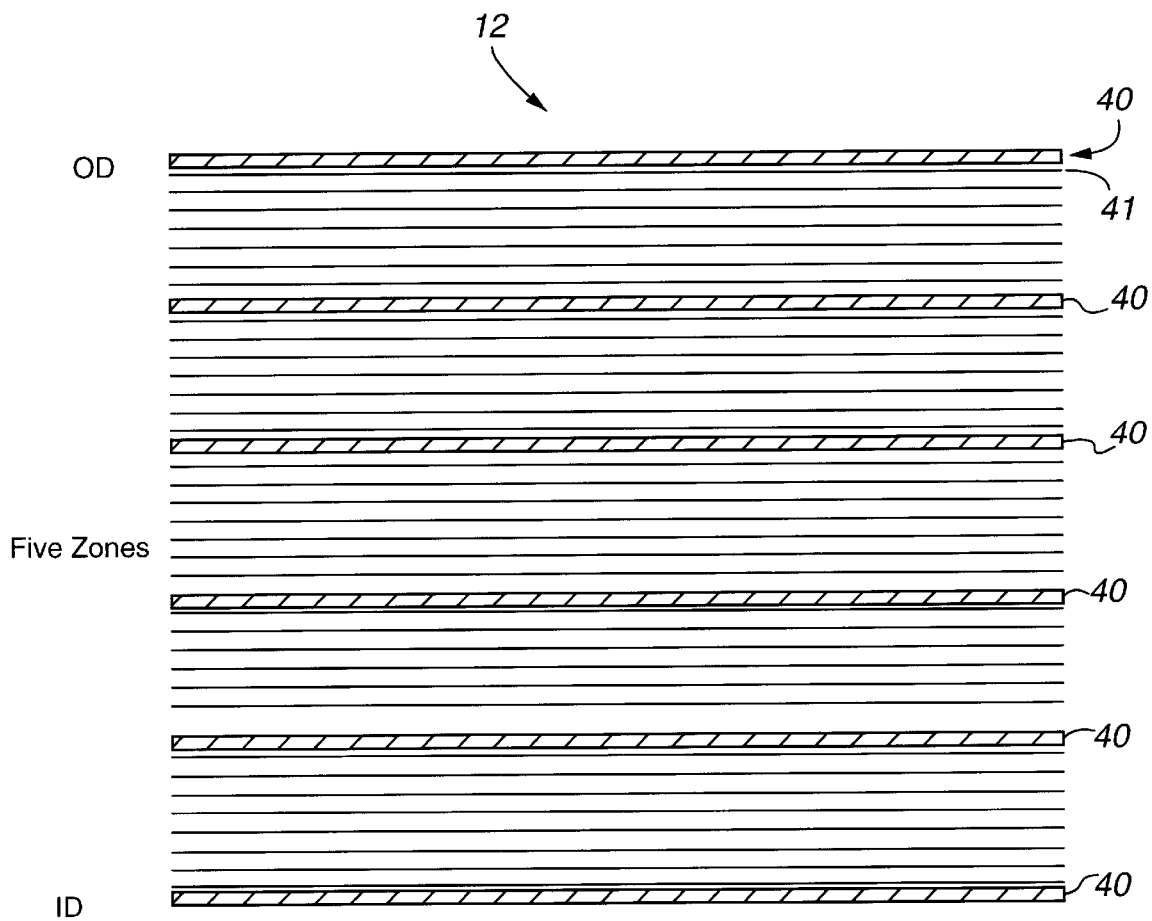
FIG. 5 is a greatly enlarged, planarized diagrammatic plan of a disk surface divided into five data zones spanned by six reference track regions each including one or more reference tracks recorded by using the FIG. 1 servowriter.

In some cases it may be useful to provide bands 40 of one or more reference tracks radially distributed across the storage area of disk 12. FIG. 5 shows e.g. 5 data track zones from an outside diameter (OD) of the disk 12 to an inside minimum usable diameter (ID) of the disk 12. In between OD and ID are e.g. six bands of reference tracks 40. A pattern of e.g. six reference tracks 40 is shown in FIG. 6B. While six reference tracks 40 are shown in FIG. 6B, other numbers of zones and reference tracks may be employed, it being generally understood that a greater number of zones is preferred over a fewer number of zones. The reference tracks 40 may include multiple sets of bursts, and the bursts may be longer than the final product bursts in order to improve PES signal to noise ratio. The reference tracks 40 are written with the aid of the servowriter 32 and enable the servo loop of the disk drive 100 to measure position error signal (PES) gain, reader to writer lateral offset across the disk, reader to writer circumferential offset, and reader width relative to writer width, for example. Also, as an alternative implementation of the present invention, it is practical to format and reserve e.g. one or more diskware data tracks 41 generally, but not necessarily, at the OD of the disk 12, for storing drive diskware which will be needed and executed during the self-servowriting operations at the self-scan station 52. Then, the drive 100 will self servowrite all of the servo bursts of tracks lying between the fully formatted diskware tracks 41 and the reference tracks 40 to create the final servo sector pattern 25. Once PES gain and write-to-read offset measurements are taken and used in deriving the self-written servo burst patterns 26, the reference servo tracks 40 may be converted into regular data tracks, since the completed disk drive 100 will be able to servo accurately at any track radial location, and the reference tracks 40 are no longer needed for disk drive servo operations.

Figure 6A:
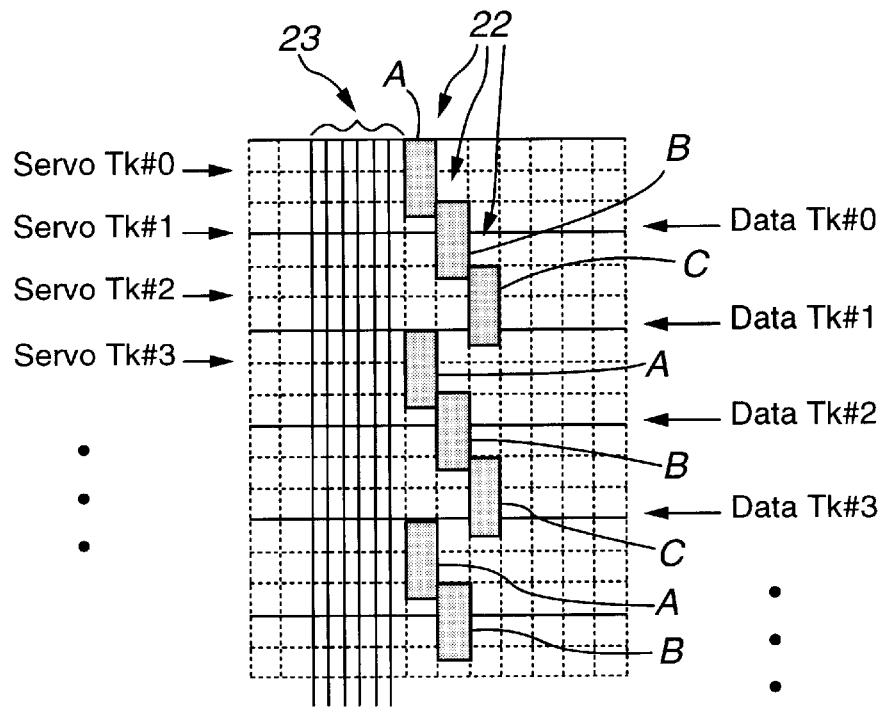
FIG. 6A is a greatly enlarged, planarized diagrammatic plan of a three-pass-per-two-data-track (1.5 pass per track) untrimmed reference servo burst pattern written at the FIG. 1 servowriter station.
Figure 6B:
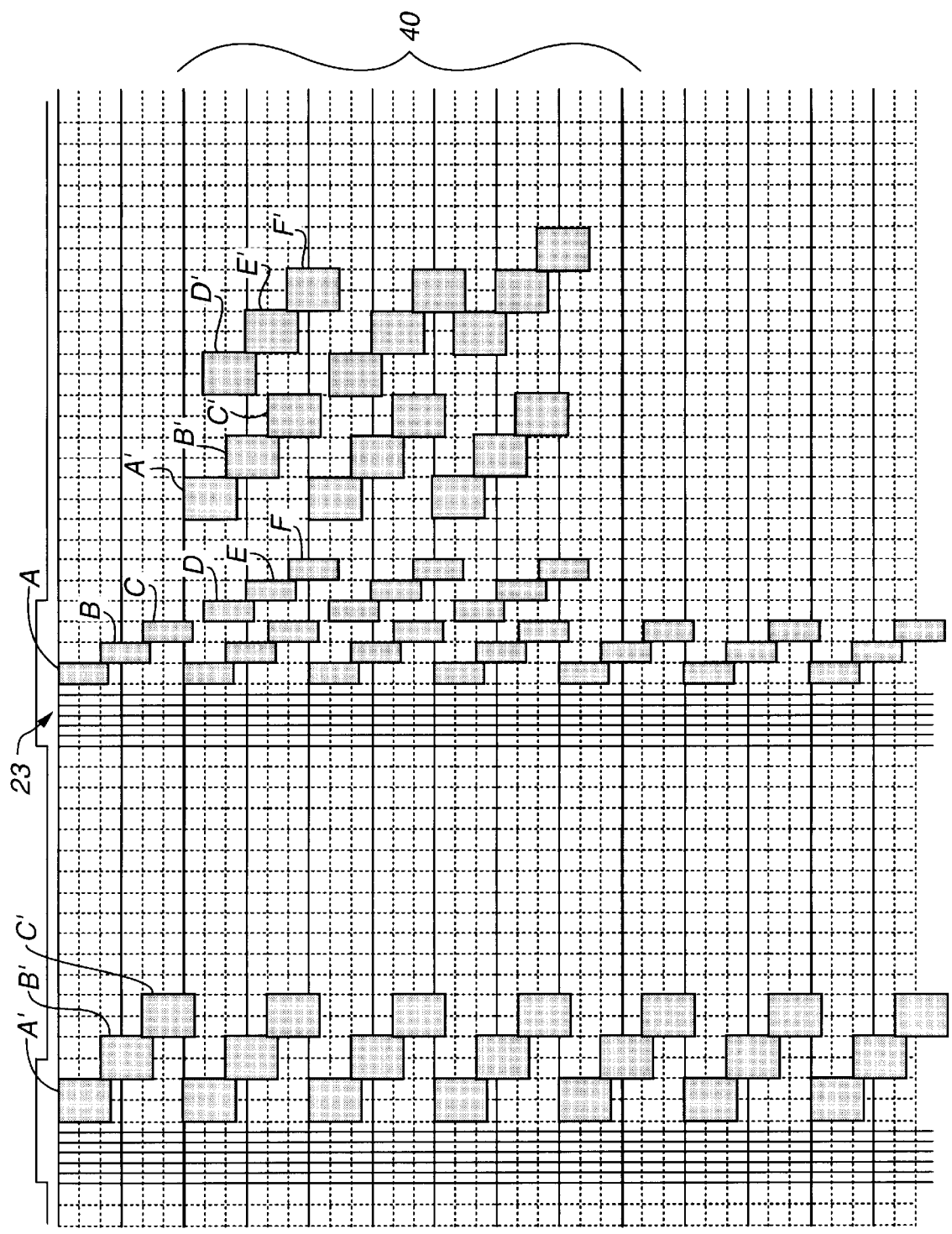
FIG. 6B is a greatly enlarged, planarized diagrammatic plan view of untrimmed reference servo burst patterns written in a FIG. 5 reference track region at the FIG. 1 servowriter station.

FIG. 6A shows one example of a servo pattern comprising servo bursts 22 and phase-coherent digital information 23 written with the aid of the FIG. 1 servowriter 32 and the write element 17. Four nominal servo track centerline locations are shown, Servo $Tk_0$, Servo $Tk_1$, Servo $Tk_2$, and Servo $Tk_3$, and four nominal data track centerline locations are also shown, Data $Tk_0$, Data $Tk_1$, Data $Tk_2$, and Data $Tk_3$. In the FIG. 6A example, the servo track centerlines have a pitch, which is two thirds the pitch of the data tracks. The dotted horizontal lines of FIG. 6A represent progressive head position loci at one-third data track pitch. Each servo track has a pitch, which is two-thirds of the pitch of each data track in this present example. Selected loci may be followed by the writer element 17 during writing of the phase-coherent digital information 23 and the untrimmed servo bursts 22 under direct control of the servowriter 32. Complete servo-writing of each data track at the servo writer would require two passes of the writer element 17; however, in accordance with principles of the present invention, only one pass per servo track is required at the servowriter in order to write the initial burst patterns needed for self-writing the final patterns and any intermediate patterns that may be required. In practice, thousands of concentric tracks are typically defined from an outer diameter (OD) to an inner diameter (ID) of the disk 12.

In the FIG. 6A example, the write element 17 is slightly greater than two-thirds of the width of each data track Tk, and the reference servo burst pattern 22 most preferably comprises three "untrimmed" servo bursts A, B, and C, written during three passes across two adjacent data tracks. The final servo burst pattern, shown in FIG. 8, comprises a three pass-per-track, untrimmed six servo burst pattern. Each final product servo sector 25 preferably includes the servo-writer aided digital fields 23, the servowriter aided bursts A, B, C, of pattern 22, and the self-written servo bursts D, E and F of pattern 26. Alternatively, all of the servo bursts may be rewritten in self-scan in order to improve RRO, at the expense of additional time at the self-scan station.

Figure 6C:
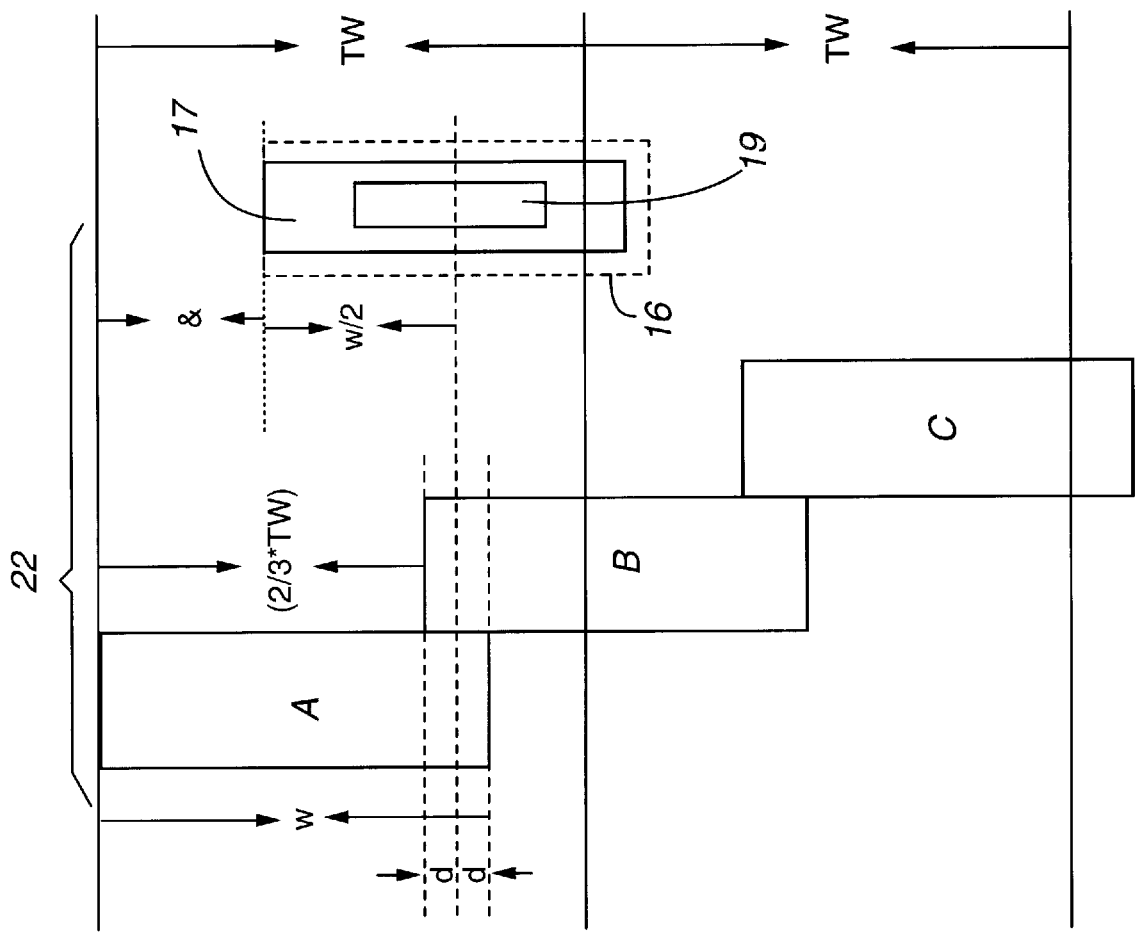
FIG. 6C is a greatly enlarged, planarized diagrammatic plan view of the FIG. 6A three-pass-per-two-data-track untrimmed reference servo burst patterns wherein a null point between two bursts provides a servo reference location in a case where the writer to reader offset is zero, thereby enabling direct writing of intermediate and final servo burst patterns at one third pitch without writer width or reader width determinations in accordance with further principles and aspects of the present invention.

In accordance with principles of the present invention, the self-written servo bursts D, E and F of pattern 26 are self-written at one-third track pitch offsets from the servowriter aided untrimmed bursts A, B and C without the need to perform time consuming writer and reader width determinations. This advantage is illustrated in FIG. 6C. In this example, the read element 19 follows a centerline locus of equal relative amplitudes of the A and B bursts. In the track-following position illustrated in FIG. 6C (where the write-to-read offset is zero), the head 16 places the write 17 at exactly one-third track pitch below a track boundary defined as an upper edge of the servowriter aided untrimmed burst A. This desirable head position for self-servowriting burst D is established mathematically, as follows:

$$w-d-(w/2)=w-(w-\tfrac{2}{3}*TW)/2-(w/2) =w-(w/2)+(\tfrac{1}{3}*TW)-(w/2)= \tfrac{1}{3}*TW,$$

where w: write element width, d: $(w-(\tfrac{2}{3}*TW))/2$ (offset distance from A–B centerline using untrimmed burst pattern, and TW: track width.

Figure 8:
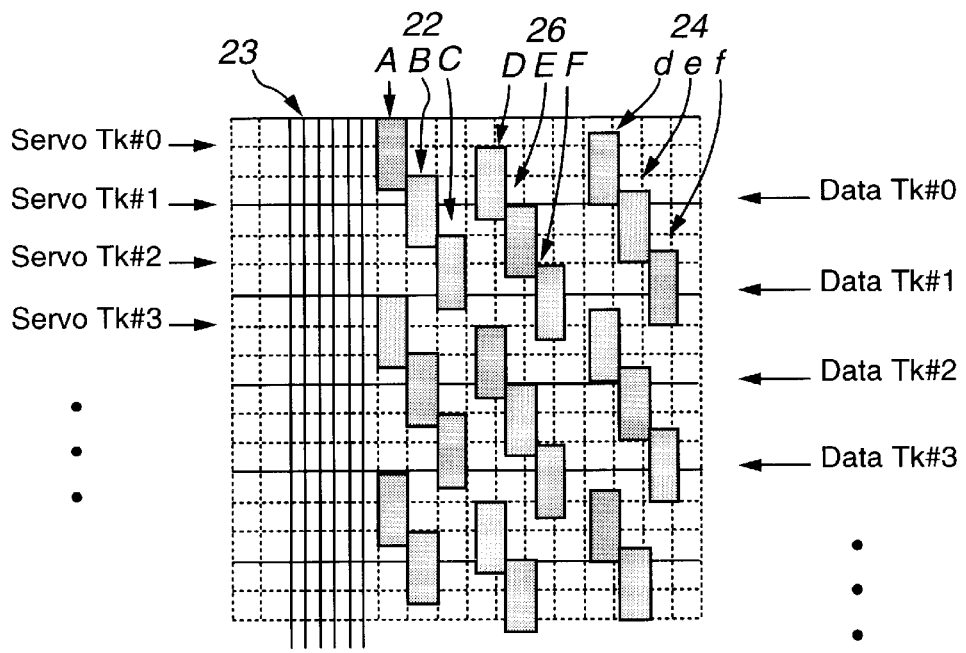
FIG. 8 is a plan view of the FIG. 7 pattern along with final untrimmed bursts self-written by the disk drive during self-scan (along with the intermediate bursts which are ultimately overwritten with user data patterns).

While previous disk drive designs have used three pass-per-track, trimmed four burst patterns, and two pass-per-track untrimmed four-burst patterns, use of the final servo pattern 25 shown in FIG. 8 has been discovered to enable use of the largest possible variation in the width of both the thin film inductive writer element 17 and of the thin film MR reader element 19. Accordingly, by using the FIG. 8 final servo pattern, writers of electrical width in a range between 66% to 120% of the nominal track width, and readers of electrical width in a range between 35% and 75% of the nominal track width, may be used, (with an additional constraint that the width of the writer element 17 will always be greater than the width of the MR reader element 19). One consequence of using untrimmed bursts in a three pass-per-track approach is that the six final servo bursts, A, B, C, D, E, and F, shown in FIG. 8, are required in order to accommodate all possible writer widths.

In the FIG. 8 example it should be noted that the centerlines of the data tracks are determined by the drive controller 57 at radial points satisfying the following relationship: $\{(C-A)-(D-E)\}=0$. For most reader widths within the useable range described above, these relationships usually produce a position error signal (PES) which includes information from four bursts in the vicinity of write track centerline, resulting in reduced RRO and PES demodulation noise within the head position servo control loop of the disk drive 100. For some heads with very narrow reader elements useful fine position information is available only from two servo bursts per servo wedge. For those narrower heads the TMR will be worse but off-track read capability ("OTC") of such heads should be better. Also, when only two bursts can be used by a particular head, the track centers for all tracks read by that head can be moved to the two-burst null point from the nominal four-burst null point.

While the FIG. 8 pattern essentially requires three separate writes for each data track, one write per each dashed horizontal line, FIG. 6A demonstrates that it is practical to write all of the digital information as well as the first three bursts A, B, and C by writing once every two-thirds of a data track (one write per two of the dashed horizontal lines). However, a drive 100 written with a pattern shown in FIG. 6A probably cannot servo well at all locations along the radial stroke of the head position actuator 16. For example, if the width of the MR read element 19 is less than about 50% of a track width, and the width of the write element 17 is 66% of a track width, then the PES will have a flat region or null in the vicinity of the centers of the B bursts. With some combinations of reader-width, writer-width and write-to-read offset, the drive can servo sufficiently accurately to write the D, E and F bursts of pattern 28 of the FIG. 8 final servo pattern in self-scan. A set of conditions under which direct writing of the final servo pattern is possible is:

1) the width of the read element is greater than 33% of the data track pitch;

2) the width of the write element is less than 133% of the data track pitch; and 3) the write-to-read offset is less than 16.7% of the data track pitch. While the first two conditions are liberal, the third condition is very restrictive to count on for all heads at all operating skew angles. For the situation where the read/write offset is beyond 16.7% of the track pitch, the self-servowriting operation is carried out in two steps.

Figure 7:
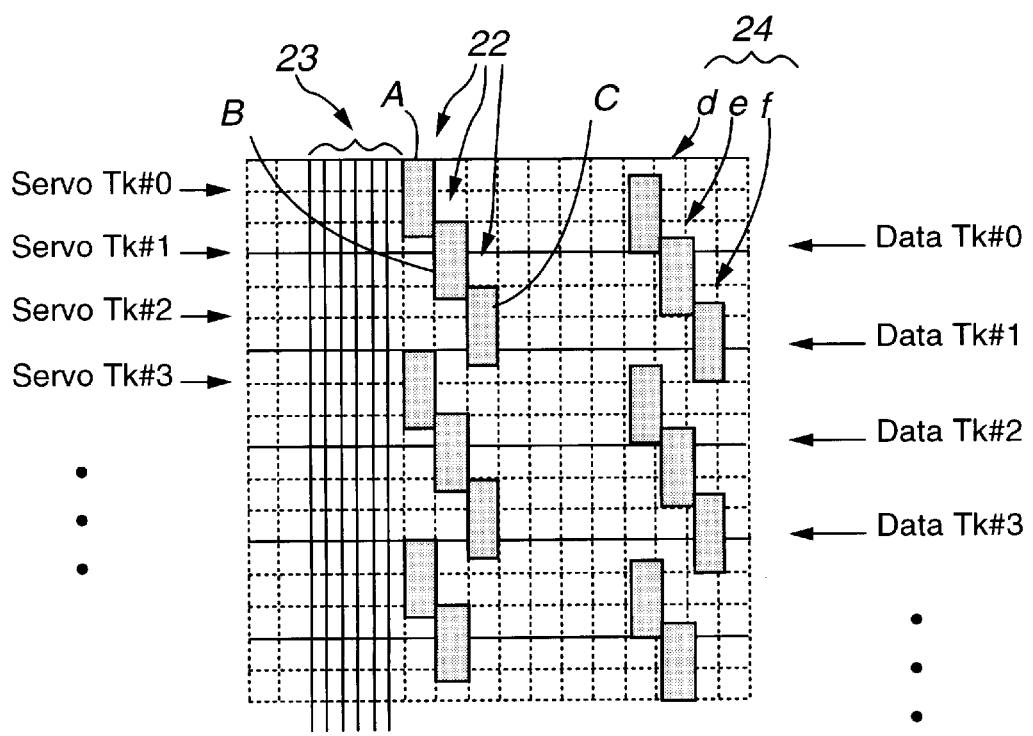
FIG. 7 is a plan view of the FIG. 6A reference track servo burst pattern and a pattern of intermediate untrimmed servo bursts self-written by the disk drive during self-scan.

As shown in FIG. 7 a first self-servowriting step causes an intermediate burst pattern 24 of bursts d, e, and f to be written at an offset of +/−16.7% of a data track. As long as the first two conditions listed above are met (limiting minimum reader width and maximum writer width) there will always be a way for the drive to servo using either adjacent radial edges of two of the original bursts 22 or adjacent radial edges of two of the intermediate bursts 24 in order to write the final bursts D, E and F of the pattern 26 shown in FIG. 8. It should be noted that for large write-to-read offsets, the servo bursts used might not be the same as the bursts used for small offsets.

As explained above in connection with FIGS. 3A, 3B, 4A and 4B, by "untrimmed" is meant that the burst widths correspond to the effective electrical width of the write element 17, and no attempt is made to DC erase the burst edges in order to trim or adjust burst widths to a nominal reference width. It will be further understood that while a single radial burst pattern 22 is shown in FIG. 6A, in practice a plurality of servo bursts are written in servo spokes extending around the disk 12. Typically, there may be as many as 90 to 150 or more servo wedges or spokes defined on disk 12, depending upon particular disk drive design considerations. The greater the number of servo spokes of a particular drive design, the greater will be the number of servo bursts.

While writing the FIG. 6A servo burst pattern, the push pin 34 of servowriter 32 guides the actuator arm 16 while the write element 17 of the head 15 writes multiple copies of the reference bursts 22 and multiple copies of phase-coherent digital servo information 23 including, for example, a sync field, a servo address mark field (which may include an index mark in one sector to mark a once-per-revolution fiducial location), a track number field, and a servo number field. The digital spoke information fields 23 are coherent from track to track, meaning that the reader 19 of head 15 can read, and the read channel 51 and drive servo controller 57 can decode, this information irrespective of some head misalignment with any particular data track centerline location. The digital spoke information 23 provides coarse positioning information needed for determining head position during track seeking operations, while the final servo burst pattern 26 will provide fine head positioning information enabling the head to be controlled precisely at a read element centerline of a data track being followed for reading, or for following a write element centerline of a data track being followed for writing user data.

In some instances it may be desirable to relax the reader/writer width tolerances and/or increase the write-to-read offset beyond the 1), 2) and 3) limits set out above. In such case, it is practical for the disk drive 100 to self-write a second intermediate servo burst pattern before self-writing the final burst pattern. Accordingly, the original reference burst pattern 24 laid down with the aid of the servo-writer 32 and the two intermediate patterns are self-written by the drive 100 at the self-scan unit 52 and used to develop the final product burst pattern. The final pattern may be a six burst untrimmed pattern, per FIG. 8, or it may be a four burst trimmed pattern, or other suitable burst pattern providing robust and reliable, linearizable PES across the stroke of the rotary actuator 16 in light of drive-specific reader/writer widths and write-to-read offset.

As shown in FIG. 2, the assembled disk drive 100 includes read channel 51 within the electronics and drive controller circuit board 50. In some instances, the read channel 51 may be limited to reading and capturing relative amplitudes of a finite number of servo bursts, following reading and decoding of the digital information fields 23. For example, in some read channel chip architectures, the read/write channel chip may not be able to read and utilize the digital information fields 23, write the servo burst fields 22, 24 and/or 26 and then demodulate the bursts within a single servo sector interval. Because of this limitation, a modified self-servo-writing approach may be followed in order to achieve the desired final self-written servo pattern 25, with minimized use of factory servowriters, such as servowriter station 32 of FIG. 1.

Figure 9:
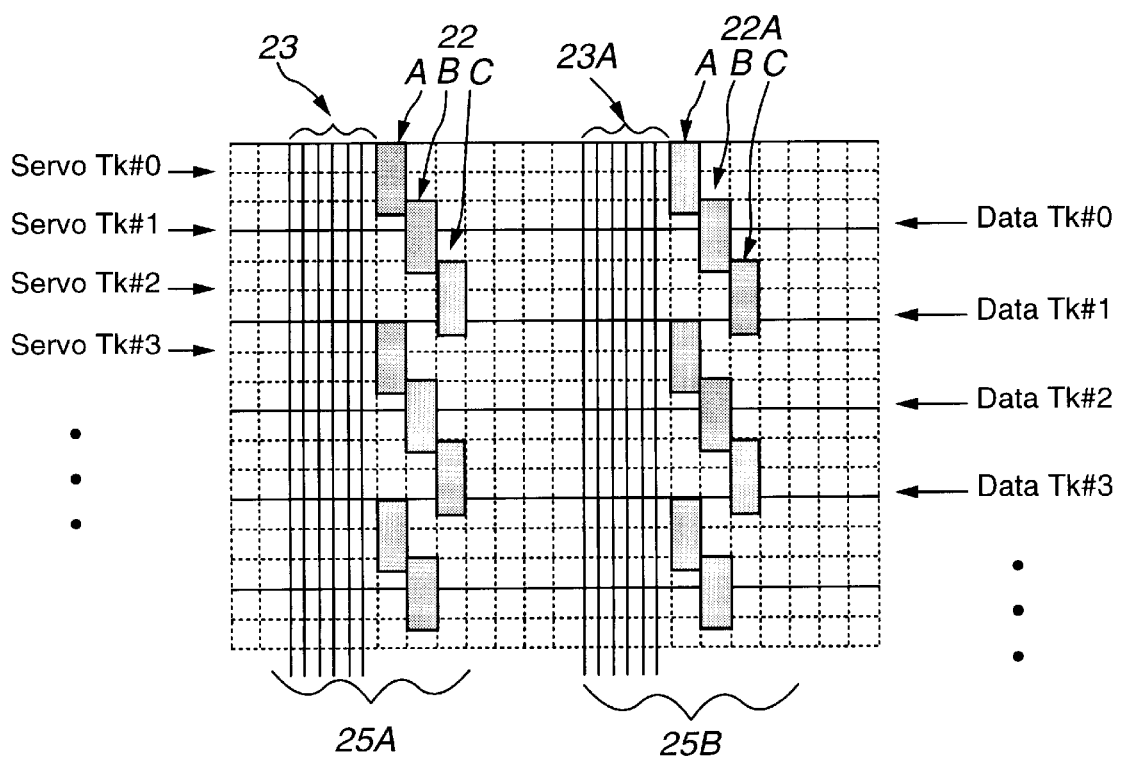
FIG. 9 is an alternative plan of two three-pass-per-data-track untrimmed servo burst patterns written with the aid of the FIG. 1 servowriter station, one of the patterns being a product digital data plus first servo burst pattern, and another one of the patterns being a reference pattern.
Figure 10:
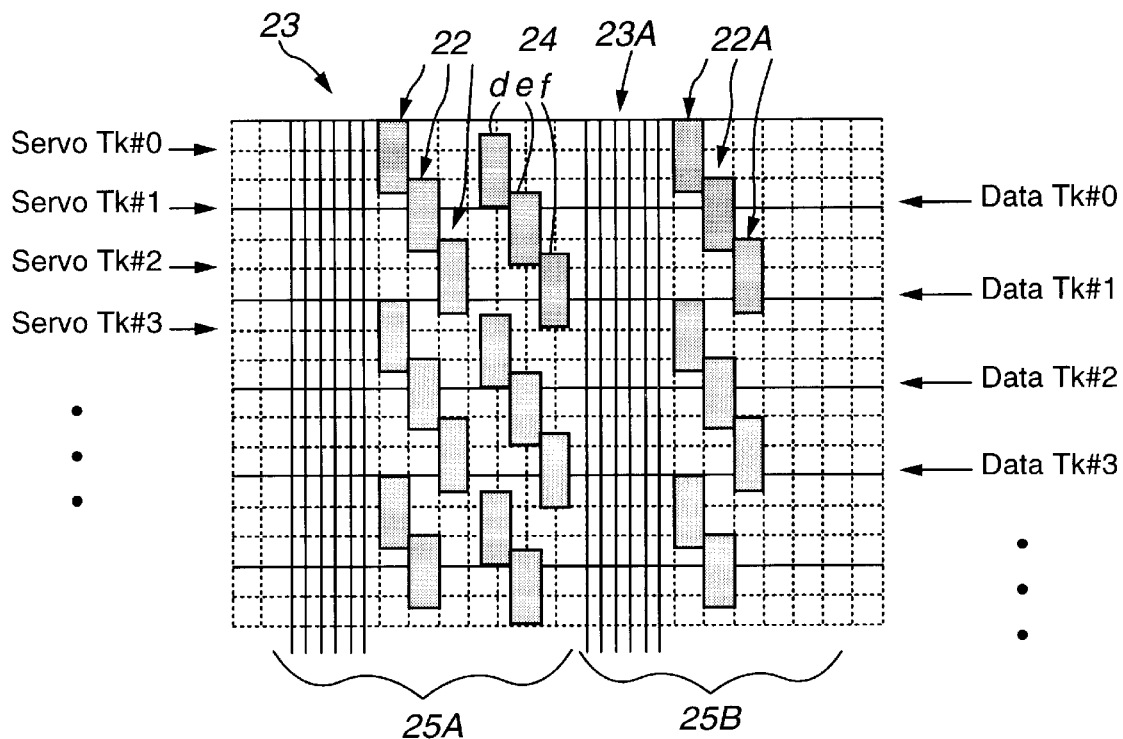
FIG. 10 is a plan view of the FIG. 9 reference track servo burst patterns and a pattern of intermediate untrimmed servo bursts self-written by the disk drive during self-scan.
Figure 11:
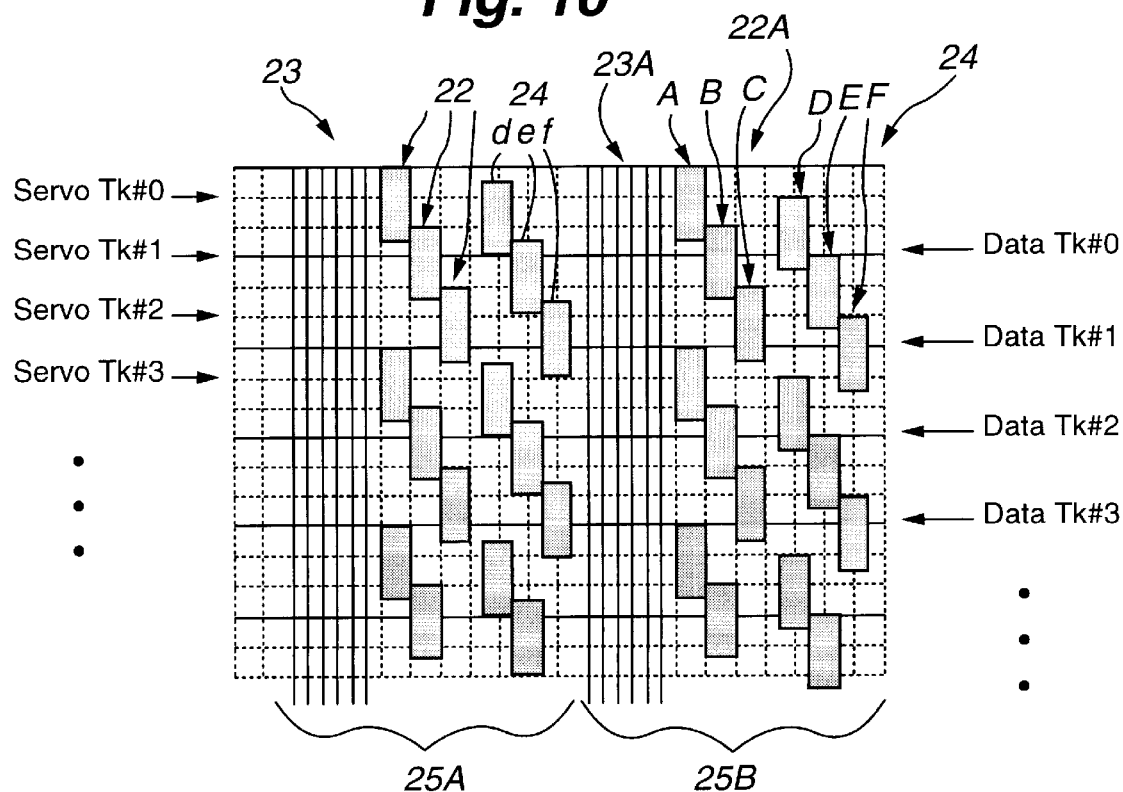
FIG. 11 is a plan view of the FIG. 10 reference and intermediate servo burst patterns and a final untrimmed servo burst pattern self-written by the disk drive during self-scan.

Turning now to FIG. 9, a presently preferred servowriting sequence calls first for the servowriter station 32 to aid in writing the digital information field 23 and the reference servo burst field 22 as a first reference servo sector pattern 25A, and aids in writing a second digital information field 23A and reference servo burst field 22A as a second reference servo sector pattern 25B. Reference tracks 40 as shown in FIG. 6B may also be written under the control of the servowriter station 32. As shown in FIG. 10, after the drive 100 is assembled and transferred to the self-scan station 52, the drive self-writes the intermediate burst pattern 24 of bursts d, e, and f, at e.g. a 16.67% track pitch relative to the reference burst pattern 22 at a location immediately following the first reference pattern 22 in the servo field 25A. Next, as shown in FIG. 11, the final product burst pattern field 26 of bursts D, E, and F is self-written by the drive 100 immediately following the second reference burst pattern 22A within the second servo sector 25B. Then, the original servo pattern 25A can be DC erased or overwritten with user data, since it is not needed for proper disk drive operation and therefore will ultimately lie in a user data storage sector of the disk storage surface.

A rough estimate of time ($T_H$) required to self-servowrite one data surface of an exemplary 3.5 inch disk drive having a track density of 16,000 tracks per inch, a spindle rotational speed of 90 Hz, a full radial actuator stroke of 0.9645 inches, 1.5 servo tracks per each data track, 14 disk revolutions per servo track during disk self-servowrite, and 3600 seconds per hour is:

$$T_H = (16000*0.9645*1.5*14*1/90)/3600 \sim 1 \text{ Hour per Head.}$$

During the 14 revolutions for each servo track, approximately one revolution is required to seek to and settle at a next track, one revolution is needed to write each intermediate burst d, e, or f, one revolution is needed to seek and settle at a position to write a final product burst D, E or F, eight revolutions are needed to collect RRO information in order for rejection of higher RRO harmonics, two revolutions are needed to compute burst correction values (BCVs) which are recorded and later combined with the digitized PES in order to cancel out positional error RRO present along the track locus being followed. The BCVs are initially stored e.g. in the drive's buffer memory 55 on circuit board 50. One final revolution is then needed to write the final product burst D, E or F within field 26 using the PES and BCV stored in memory for the particular sector location. More than 14 revolutions for each servo track may be required as RRO is improved by using BCVs to write intermediate as well as final burst patterns. BCVs may be recorded in a BCV field of the servo sector for use by the product servo system following manufacturing and delivery of the drive to the customer.

The BCVs may be determined over multiple rotations of the disk 12 while the head read element 19 follows the same radial actuator position (track locus). One presently preferred example of a method for calculating burst correction values is described in commonly assigned U.S. Pat. No. 5,793,559 to Shepherd et al, entitled: "In Drive Correction of Servo Pattern Errors", the disclosure thereof being incorporated herein by reference. After the BCVs are calculated by the drive electronics 50, the values are applied to adjust position of the head arm 16 and head 15 as the final bursts D, E and F are written into each final servo sector. In this manner, the final self-written burst pattern 26 may have no worse RRO than an equivalent pattern written during a single pass using the servowriter 32. If the drive servo loop compensates for disk vibration and/or spindle NRRO during self-servowriting, the final servo burst pattern may actually have less RRO than the servowriter generated servo burst pattern. A preferred self-servowriting method calls for first writing all of the intermediate bursts d, e, and f, that the drive needs, and then going back and writing the final bursts, by collecting the RRO and processing the appropriate BCV data immediately before writing each final burst D, E or F.

In self-servowriting product servo bursts it is very important to maintain a design correlation between track centerline as determined by servo bursts and the track centerline of the digital servo information field. Therefore, low harmonic RRO is followed by the disk drive servo loop's adaptive runout correction system, and high harmonic RRO is corrected for by using BCVs in writing the final burst pattern. For any written-in runout that is small compared to a track width, such runout is preferably ignored so that smoother bursts are written in order to define a more circular track locus.

Since self-servowriting time at the self-scan unit 32 is less precious than servowriter/clean room time, it becomes practical to speed up the disk rotation at the servowriter 32 in writing the initial reference burst pattern 22, and slow down the disk rotation at self-scan during writing of the intermediate burst pattern 24, and the final burst pattern 26. This approach also aids in reducing the amount of written-in repeatable run out in the final burst pattern 26.

Use of dual-stage actuators may provide practical enhancements in implementing the present invention. If the head positioner 16 is placed at a nominal cylinder track center, then a micro-actuator 18 associated with a particular head may be "steered" to follow a desired track locus.

Independent of any limitations of the drive read channel chip 51, it may be desirable to write a double servo reference pattern on the disk 12 to enable a double-sample-rate servo sector sampling arrangement during the self-scan self-servowriting operations. Double sampling of reference servo bursts enables the drive servo loop to do a better job of following NRRO during the self-servowriting process and results in less RRO in the self-servowritten bursts D, E and F. A double-sample servo rate presupposes that the disk drive control electronics has sufficient computational speed and data processing capability in order to make the necessary RRO and BCV calculations without unduly incurring additional disk rotational latencies in carrying out the required computations. A special purpose high speed computer may be used in this case in lieu of the product electronics board 50 in order to control the head-disk assembly 10 during self-servowrite.

While stagger servowriting and bank servowriting techniques are known, it is presently preferred to employ a staggered self-servowriting process, which progresses from head to head (surface to surface) along the disk stack. Stagger servowriting means that the servo patterns of the storage surfaces of the drive are progressively written (circumferentially staggered) during a single revolution of the disk. This approach is sometimes employed to minimize time at the servowriter station 32, but when used in accordance with principles of the present invention, this approach can result in significant offsets between the center of track as defined by the bursts and the center of a track as indicated by a track number within the coherent digital information fields 23. This offset can be calibrated by following various off-track positions in the vicinity of the nominal track and noting how the track number value varies with each offset. It is necessary to calibrate this offset to be within a small fraction of a servo track pitch (two-thirds of the data track pitch). If the calibration is off by too much, it could result in a discrepancy between a digital track number and a burst-determined track centerline such that the drive 100 writes data at the wrong track location, and thereby loses user data.

Bank servowriting calls for writing all data storage surfaces with servo information in parallel during a single revolution of the disk, and bank writing has another problem in addition to the offset problem noted with stagger servowriting. It is possible that the tangential skews between heads will change significantly when the disk drive is moved from the servowriter station 32 to the self-scan station 52. Actual measurements have shown that the tangential skew from a top head to a bottom head of a five-disk 3.5 inch, 5400 RPM drive can take as long as 2 microseconds. Any such skew would have to be accommodated by leaving space in the format for locating the bursts relative to the digital information fields 23. A conservative estimate of the necessary tolerance or "slop" time would be one half microsecond. Also, the burst timing skew (latency) relative to the digital fields 23 would have to be calibrated on a per-head, per-zone basis, so that the drive's servo control loop could properly demodulate the servo bursts and develop the PES. However, if dual-stage actuators are available for servo-control of each individual head position, and either if servo pattern offsets are employed between disk surfaces or if multiple read/write channels are simultaneously present, it may be practical to servowrite multiple storage surfaces simultaneously and with high accuracy, by having micro-actuator 18 canceling the effects of DC offsets and learned NRRO at each storage surface being servowritten or self-servowritten, at a particular cylinder location of the disk stack.

One benefit in following a single head/surface self-servo-write is that the offset between burst-center and track-number center will be small enough to enable use within the final product servo pattern of the first three reference bursts, A, B, C which are written under direction of the servowriter 32, and use the self-servowriting process for writing only the three final burst patterns D, E, and F, as explained above. However as mentioned above, too large an offset between burst track center and digital track number centers (unless properly calibrated) can result in track number identification errors and lost data.

Figure 12:
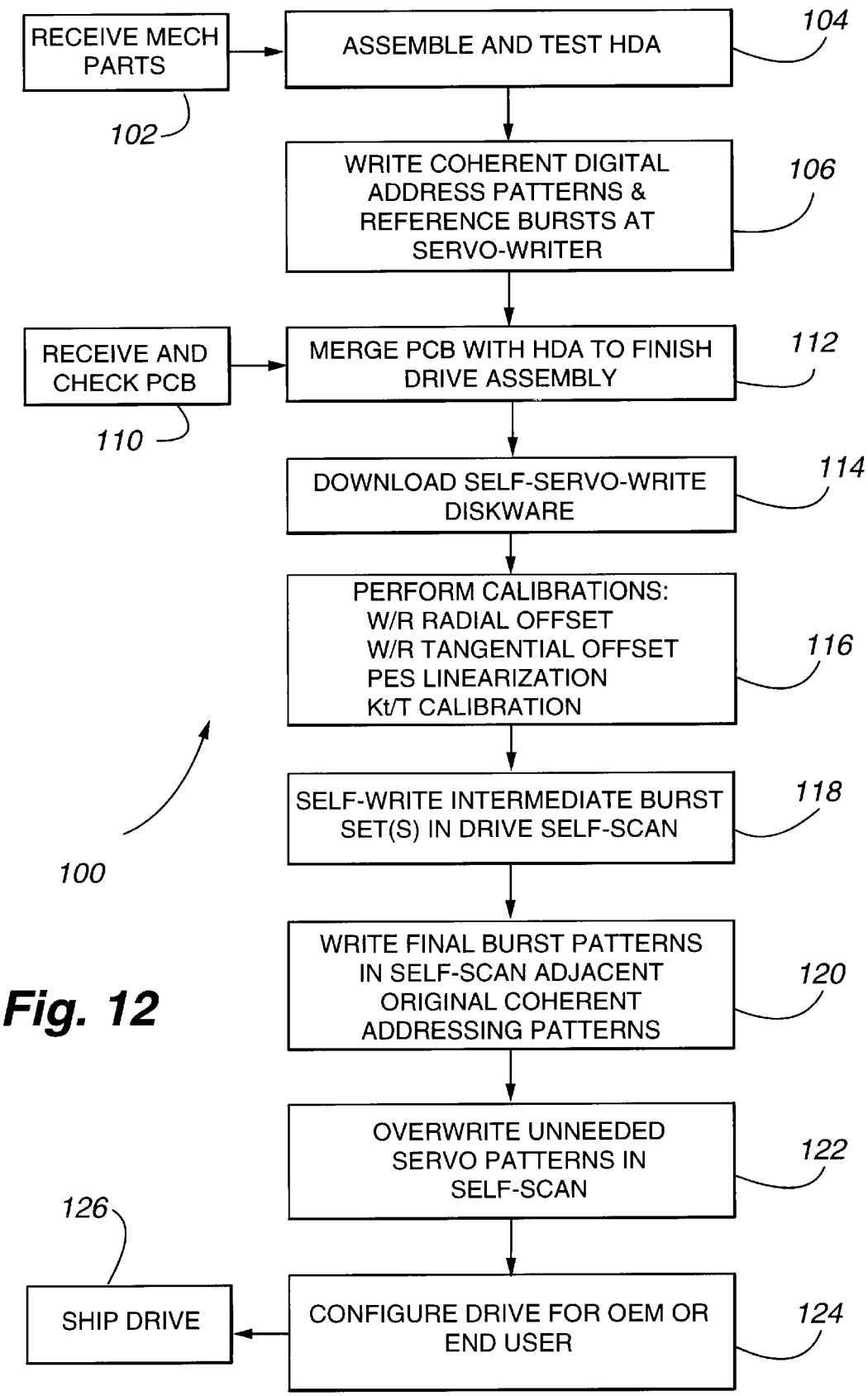
FIG. 12 is a high level flow diagram of a disk drive manufacturing process in accordance with principles of the present invention.

The FIG. 12 flow chart summarizes a disk drive manufacturing method 100 in accordance with principles of the present invention. The components and parts comprising the HDA 10 are received and inspected at a step 102, and then assembled into the HDA 10 within the clean room or clean environment 30 and tested at a step 104. Then, the tested HDA 10 is moved to the servo-writer station 32, still within the clean room 30 and initial reference servo patterns are written onto at least one disk surface by the write element 17 under direct control of the servo-writer 32 at a step 106. Then the HDA 10 is completely enclosed, sealed and removed from the servo-writer station 32 and the clean room 30.

At a step 110, the assembled drive printed circuit board is received and checked out electrically. The board is then merged with the HDA at a step 112 to complete the disk drive assembly process and then moved to a self-scan rack location. At a step 114, after the drive is connected to the self-scan unit 52, self-servo-write firmware is downloaded to the buffer 55 of the drive. Then, at a step 116, a number of critical calibrations are performed, including (but not necessarily limited to) radial and tangential write element to read element offset, PES linearization for each head 15, and torque constant (kt/T) over the actuator stroke. At a step 118 a pattern of intermediate servo burst sets, e.g. the bursts d, e, and f, is self-written by the drive to each storage surface, and a final set of burst patterns, e.g. the bursts D, E and F, is self-written to each storage surface at a step 120. The original/intermediate burst patterns may then be DC erased or overwritten with test patterns at a step 122 subsequently during self-scan. Finally, the drive may be configured for a customer's particular requirements at a step 124, and packed and shipped to the customer at a step 126.

It is to be understood that the particular implementations described are intended as illustrations of, and not as limiting the scope of, the claims. It will of course be appreciated that in the development of any such actual implementation, numerous implementation-specific decisions must be made to achieve the developers' specific goals, such as compliance with system-related and business-related constraints and that these goals will vary from one implementation to another. Moreover, it will be appreciated that such a development effort might be complex and time-consuming, but would nevertheless be a routine undertaking of engineering for those of ordinary skill having the benefit of this disclosure.

Although the present invention has been described in terms of the presently preferred embodiment, it should be clear to those skilled in the art that the present invention may also be utilized in conjunction with, for example, other disk drive servowriting methods and patterns. Thus, it should be understood that the instant disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A method for servowriting track locations of a storage surface of a magnetic hard disk of a head-disk assembly, comprising the steps of:

servo-writing a first servo burst pattern by using a servowriter coupled to the head-disk assembly;

connecting a special circuit board to the head-disk assembly, said special circuit board adapted for self-writing;

self-writing a final servo burst pattern using said special circuit board and the first servo burst pattern without using the servowriter;

disconnecting the special circuit board from the head-disk assembly once the final servo burst pattern has been written; and, connecting a drive electronics circuit board to the head-disk assembly after the special circuit board has been disconnected.

2. The method set forth in claim 1 comprising the further step of self-writing at some track locations of the storage surface a second servo burst pattern having circumferential burst edges radially offset relative to burst edges of the first burst pattern by reading the first burst pattern with a head of the head-disk assembly without using the servowriter, and self-writing at said some track locations a final servo burst pattern by using the first burst pattern and the second servo burst pattern without using the servowriter.

3. The method set forth in claim 2 comprising the further step of selfwriting at said some track locations of the storage surface a third servo burst pattern having circumferential burst edges located radially intermediate circumferential edges of the first servo burst pattern and the second servo burst pattern, and wherein the step of self-writing at said some locations the final burst pattern is carried out by using the first burst pattern, the second burst pattern and the third burst pattern.

4. The method set forth in claim 3 comprising the further step of self-writing at said some track locations of the storage surface a fourth servo burst pattern having circumferential burst edges located radially intermediate circumferential edges of the first servo burst pattern and the third servo burst pattern, and wherein the step of self-writing at said some locations the final burst pattern is carried out by using the first burst pattern, the second burst pattern, the third burst pattern and the fourth burst pattern.

5. The method set forth in claim 1 wherein the step of servowriting the first servo burst pattern is carried out at a servowriter station located within a clean room environment, and wherein the step of self-writing the final servo burst pattern is carried out at a location outside of the clean room environment.

6. The method set forth in claim 5 comprising a further step of using the special circuit board to carry out the self-writing step during self-scan at a self-scan station outside of the clean room environment.

7. The method set forth in claim 1 comprising a further step of downloading self-servowriting control routines to the special circuit board prior to the self-writing step.

8. The method set forth in claim 1 comprising further steps of servo-writing at least one reference track by using the servowriter and self-reading the at least one reference track to determine characteristics of the head-disk assembly.

9. The method set forth in claim 8 wherein the step of servowriting at least one reference track comprises servo-writing a plurality of reference tracks across a radial extent of a storage disk of the head-disk assembly and wherein the step of self-reading the at least one reference track comprises the step of self-reading the plurality of reference tracks.

10. The method set forth in claim 8 wherein the head-disk assembly includes a rotary actuator head positioner for positioning a dual element read/write head having a read element with a width less than a write element, such that the read element manifests a positional offset relative to the write element as a function of angular position of the rotary actuator head positioner, and wherein the step of determining characteristics includes the step of determining reader to writer offset as a function of angular position.

11. The method set forth in claim 1 wherein a final servo sector burst pattern of the head-disk assembly includes the first burst pattern and the final burst pattern.

12. The method set forth in claim 11 wherein the final servo sector burst pattern of the head-disk assembly includes an untrimmed six burst pattern comprising untrimmed bursts A, B, C of the first pattern and untrimmed bursts D, E, and F, each burst being radially offset from every other burst within the burst pattern.

13. The method set forth in claim 12 wherein each data track is nominally centered on the storage surface in accordance with the relation: $\{(C-A)-(D-E)\} = 0$.

14. The method set forth in claim 1 wherein a head of the drive includes a write element and a read element, wherein the write element has a writing width approximately two-thirds of a track width and wherein the final servo sector burst pattern of the head-disk assembly includes an untrimmed six burst pattern comprising untrimmed bursts A, B, C, D, E, and F, each burst being radially offset from every other burst within the burst pattern by one-third track pitch.

15. The method set forth in claim 14 wherein untrimmed bursts A, B and C are recorded at the servo-writing step, and wherein the bursts D, E and F are recorded at the self-writing step.

16. The method set forth in claim 15 comprising the further step of determining write element to read element offset and wherein the drive self-writes the final servo burst pattern at one-third track pitch intervals after determination of write-element-to-read-element offset by following A-B or B-C burst centerlines without determining write element width or read element width.

17. The method set forth in claim 16 wherein the write element has an electrical width lying in a range between 66% and 120% of nominal track width, and wherein the read element has an electrical width lying in a range between 35% and 75% of the nominal track width.

18. The method set forth in claim 1 wherein the step of servo-writing a first servo burst pattern by using a servowriter coupled to the head-disk assembly is carried out by progressively writing servo tracks having a servo track pitch of one and one half times a data track pitch of data tracks defined on the storage surface of the disk such that there are two servo track writing passes for each data track.

19. The method set forth in claim 1 wherein the step of servo-writing a first servo burst pattern by using a servowriter further comprises writing digital servo data to the surface.

20. The method set forth in claim 19 wherein the step of writing digital servo data to the surface is carried out directly ahead of the step of writing the first servo burst pattern.

21. The method set forth in claim 1 wherein the step of self-writing a final servo burst pattern using the special circuit board and the first burst pattern without using the servowriter comprises the step of determining repeatable runout errors over multiple revolutions of the disk at a particular data track location and calculating and applying burst correction values to minimize determined repeatable runout errors while self-writing the final servo burst pattern.

22. The method set forth in claim 1 wherein the special circuit board has a first computing speed and the drive electronics circuit board has a second computing speed, and wherein the first computing speed is greater than the second computing speed.

23. The method set forth in claim 1 wherein the step of self-writing includes writing first and second servo sets of digital servo data wherein the final burst pattern is self-written within the second servo set.

24. The method set forth in claim 21 further comprising the step of calculating and applying burst correction values while self-writing the final servo burst pattern.

25. A magnetic hard disk drive including at least one data storage disk, a head transducer comprising an inductive write element and a magneto-resistive read element and positioned at radial track locations defined on a storage surface of the disk by a head positioner, the disk drive including a drive controller for controlling at least the head positioner to position the head transducer at selected data tracks, the disk drive having reference servo patterns recorded onto at least a part of the storage surface by a servo writer as a part of a manufacturing process, the reference servo patterns being incomplete with respect to a final product pattern, the disk drive having self-servowriting software executed by the drive for self-writing embedded servo final product patterns across the storage surface in response to the reference servo patterns, wherein the disk drive self-servo-writing software causes the disk drive to self-write intermediate servo bursts using the reference servo patterns, wherein said intermediate servo bursts are used to write said final product patterns, wherein said intermediate servo bursts are written in user data locations, and wherein said intermediate servo bursts are overwritten with user data.

26. The magnetic hard disk drive set forth in claim 25 wherein the reference servo patterns are recorded onto the storage surface by the write element of the head transducer under direct control of the servo writer.

27. The magnetic hard disk drive set forth in claim 25 wherein the reference servo patterns include digital track information fields which are substantially phase coherent from track to track and which include digital track number information.

28. The magnetic hard disk drive set forth in claim 25 wherein the reference servo patterns include repeating patterns of circumferentially sequential, radially offset reference servo bursts.

29. The magnetic hard disk drive set forth in claim 28 wherein the write element has a magnetic writing width which is wider than a magnetic reading width of the read element and wherein the reference servo bursts provide centering information relative to a data track for some, but not all, radial positions within a single track pitch.

30. The magnetic hard disk drive set forth in claim 29 wherein the magnetic writing width lies in a range of 66% and 120% of nominal track width, and wherein the magnetic reading width lies in a range between 35% and 75% of the nominal track width.

31. The magnetic hard disk drive set forth in claim 30 wherein the reference servo bursts are included within a final product servo burst pattern self-written by the disk drive.

32. The magnetic hard disk drive set forth in claim 30 wherein a final product servo burst pattern self-written by the disk drive comprises for each pair of adjacent data tracks an untrimmed six servo burst pattern of bursts A, B, C, D, E, and F.

33. The magnetic hard disk drive set forth in claim 32 wherein the disk drive controller causes the head positioner to center the head transducer on a data track in accordance with the relation: $\{(C-A)-(D-E)\} = 0$.

34. The magnetic hard disk drive set forth in claim 25 wherein the disk drive comprises a dual-stage actuator having a micro-actuator for independently positioning each head transducer, and wherein the disk drive controller separately controls the head positioner and each micro-actuator.

35. The method set forth in claim 25 wherein the first servo set is overwritten by user data.

36. A method of writing servo information onto a disk surface of a disk drive, the method comprising the steps of:

writing a first reference pattern in a first region of the disk surface using a servo track writer;

writing a second reference pattern in a second region of the disk surface using the servo track writer;

self-servo-writing an intermediate reference pattern in the first region of the disk surface using the first reference pattern;

self-servo-writing a final product burst pattern in the second region of the disk surface using the intermediate reference pattern, wherein the final product burst pattern is written at a location proximate to the second reference pattern; and, overwriting the first reference pattern and the intermediate reference pattern with user data.

* * * * *